United States Patent
Roy et al.

(10) Patent No.: US 12,519,279 B2
(45) Date of Patent: Jan. 6, 2026

(54) ACTIVE LMA OPTICAL FIBER WITH ENHANCED TRANSVERSE MODE STABILITY

(71) Applicant: INSTITUT NATIONAL D'OPTIQUE, Quebec (CA)

(72) Inventors: Vincent Roy, Quebec (CA); Mathieu Boivin, Quebec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 882 days.

(21) Appl. No.: 17/836,153

(22) Filed: Jun. 9, 2022

(65) Prior Publication Data

US 2023/0402808 A1 Dec. 14, 2023

(51) Int. Cl.
*H01S 3/00* (2006.01)
*H01S 3/067* (2006.01)
*H01S 3/16* (2006.01)

(52) U.S. Cl.
CPC ...... *H01S 3/06716* (2013.01); *H01S 3/06733* (2013.01); *H01S 3/1618* (2013.01)

(58) Field of Classification Search
CPC . H01S 3/06716; H01S 3/06733; H01S 3/1618
See application file for complete search history.

(56) References Cited

U.S. PATENT DOCUMENTS

| | | |
|---|---|---|
| 6,832,026 B2 | 12/2004 | Carter et al. |
| 8,731,358 B2 | 5/2014 | Pare et al. |
| 9,214,781 B2 | 12/2015 | Honea et al. |
| 9,235,106 B2 | 1/2016 | Jáuregui et al. |
| 9,325,151 B1 | 4/2016 | Fini et al. |
| 9,972,961 B2 | 5/2018 | Sipes, Jr. et al. |
| 10,263,383 B2 | 4/2019 | Headley |
| 10,985,519 B2 | 4/2021 | Roy et al. |
| 2017/0299900 A1 | 10/2017 | Montoya et al. |
| 2021/0126422 A1* | 4/2021 | Dragic ................ C03C 25/16 |

FOREIGN PATENT DOCUMENTS

| | | | |
|---|---|---|---|
| CN | 112586148 A * | 4/2021 | ......... G02B 6/02395 |
| EP | 2371043 B1 * | 1/2021 | ........... H01S 3/0675 |

* cited by examiner

*Primary Examiner* — Mark Hellner
(74) *Attorney, Agent, or Firm* — Lempia Summerfield Katz LLC

(57) ABSTRACT

An active LMA optical fiber for mitigating Transverse Mode Instability effects is provided. The core of the fiber includes a center core region having one or more rare-earth center dopants and one or more center co-dopants, and a peripheral core region free of rare-earth dopants and having one or more peripheral dopants. The radial refractive-index profile of the core is generally continuous across a boundary between the center core region and the peripheral core region. The selection and the concentrations and distributions of the rare-earth center dopants, the center co-dopants and the peripheral dopants are such that the temperature coefficient is lower in the peripheral core region than in the center core region.

17 Claims, 9 Drawing Sheets

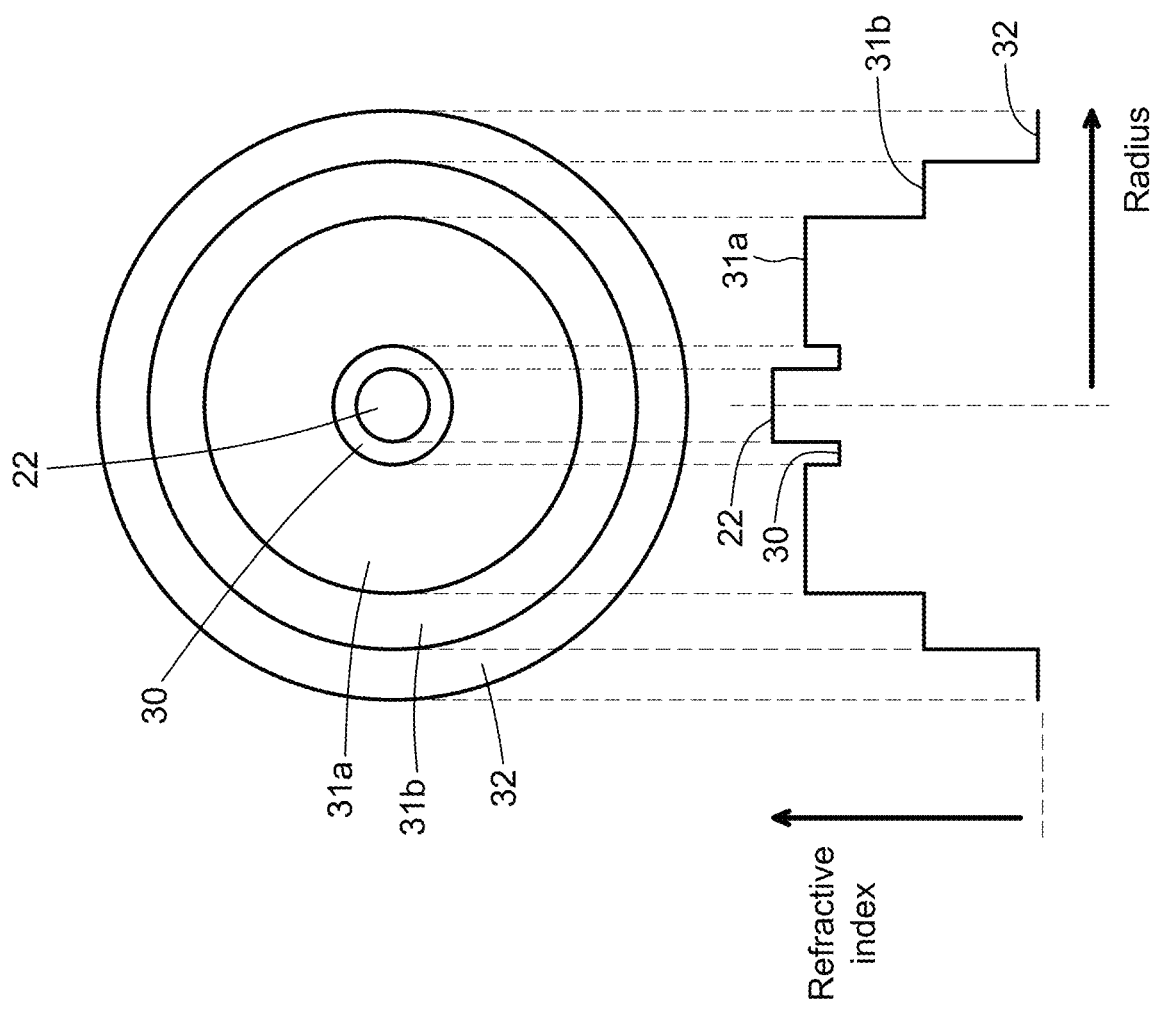

Uniform-Index Core

Linear Graded-Index Core

Parabolic Graded-Index Core

ACTIVE LMA OPTICAL FIBER WITH ENHANCED TRANSVERSE MODE STABILITY

TECHNICAL FIELD

The technical field generally relates to active LMA optical fibers and more particularly concerns fibers having a core configuration mitigating Transverse Mode Instability effects.

BACKGROUND

Transverse Mode Instability (TMI) is a phenomenon that takes place in active Large Mode Area (LMA) optical fibers used in optical amplifiers, for example fibers having a core doped with rare earths such as ytterbium, once the heat load in the fiber exceeds a certain threshold. This heat load is understood to originate from the quantum defect of the radiative transition coming from the laser inversion in the core material initiated by optical pumping, but also from background losses and photodarkening in the fiber. The instability unfolds as a refractive-index grating is formed in the fiber core following the spatial intensity pattern caused by the interference of the fundamental transverse mode ($LP_{01}$) with the first higher-order mode ($LP_{11}$) and causing the former to shed some energy to the latter. The mode coupling taking place beyond the given threshold is responsible for beam distortions and pointing fluctuations in the amplifier output, thus limiting the use of these fibers for several applications.

The occurrence of TMI is known in the art as a serious obstacle to attempts at scaling the power of lasers based on active fibers beyond a few kilowatts, as shown in FIG. 1 (PRIOR ART). LMA fibers are known to support higher-order transverse modes in addition to the fundamental transverse mode. Indeed, LMA fibers with core diameters as large as 50× the wavelength of the light propagating therein may not be considered single-mode, even with the most special designs known in the art. Such large core diameters are needed to reduce the light intensity in the fiber core and to avoid distortions induced by nonlinear effects such as Stimulated Raman Scattering. On the other hand, TMI may be prevented by using fibers with smaller core diameters, such that they may support only the fundamental mode, if possible.

Various mitigation strategies to TMI have been reported in the art. Referring for example to U.S. Pat. No. 9,214,781 (Honea et al), an apparatus and method for suppressing modal instabilities in fiber-amplifier systems are disclosed, involving a hybrid fiber with a smaller core in the initial length where the thermal loads are the highest, followed by a larger-core fiber. U.S. Pat. No. 9,972,961 (Sipes et al) shows a fiber optic amplifier system including a first core fiber having a first core diameter and a first cladding size; a second stage, comprising a second core fiber having a second core diameter and a second cladding size; and a double mode adapter connecting the first stage to the second stage. Active methods to inhibit the onset of TMI have also been disclosed in the art, for example in U.S. Pat. No. 9,235,106 (Jauregui et al) and U.S. Patent Application No. 2017/0299900 (Montoya et al). U.S. Pat. No. 9,325,151 (Fini et al) and U.S. Pat. No. 10,263,383 (Headley) disclose TMI mitigation methods with specific layouts for fiber spooling in laser systems.

There remains a need in the art for TMI mitigation strategies that provide improvements on the prior art.

SUMMARY

In accordance with one aspect, there is provided an active Large-Mode-Area (LMA) optical fiber for mitigating Transverse Mode Instability (TMI) effects. The active LMA optical fiber comprises a core and one or more claddings surrounding said core, the core having a refractive index and a temperature coefficient each having a radial profile, the core comprising:

a center core region having a center core glass composition comprising one or more rare-earth center dopants and one or more center co-dopants, said rare-earth center dopants and center co-dopants having respective concentrations and distributions determining radial profiles of the refractive index and of the temperature coefficient within said center core region; and a peripheral core region contiguously surrounding said center core region, the peripheral core region having a peripheral core glass composition which is free of rare-earth dopants and comprises one or more peripheral dopants, said peripheral dopants having respective concentrations and distributions determining radial profiles of the refractive index and of the temperature coefficient within said peripheral core region, wherein the radial refractive index-profile of the core is generally continuous across a boundary between the center core region and the peripheral core region; and wherein a selection and the concentrations and distributions of the rare-earth center dopants, the center co-dopants and the peripheral dopants are such that the temperature coefficient is lower in the peripheral core region than in the center core region.

In some implementations, the refractive index of the core has a same uniform value across the center core region and the peripheral core region, and the temperature coefficient has a first uniform value across the center core region and a second uniform value across the peripheral core region.

In some implementations, the radial temperature-coefficient profile in the core is linearly graded or parabolic.

In some implementations, the radial temperature-coefficient profile forms a step function at the boundary between the center core region and the peripheral core region.

In some implementations, the temperature coefficient in the peripheral core region is about 5% to about 35% lower than the temperature coefficient in the center core region.

In some implementations, the temperature coefficient in the center core region is at least 10% or at least 20% lower than the temperature coefficient in the peripheral core region.

In some implementations, the active LMA optical fiber has a TMI threshold that exceeds by a factor of about 30% or more, about 50% or more, or about 100% or more, a TMI threshold of an equivalent optical fiber having an equivalent core having a same core diameter as the active LMA optical fiber and a continuous radial temperature-coefficient profile across said equivalent core.

In some implementations, a weighted mean of molar refractivities of the one or more peripheral dopants is about the same as the weighted mean of the molar refractivities of the rare-earth center dopants and center co-dopants and at least one of the peripheral dopants has negative contribution to the temperature coefficient.

In some implementations, the one or more center co-dopants include at least one of phosphorus, aluminum and fluorine. Preferably, the one or more peripheral dopants include at least one of phosphorus, fluorine and boron.

In some implementations:
the rare-earth center dopant consists of ytterbium;
the center co-dopants consist of phosphorus, aluminum and fluorine; and
the peripheral dopants consist of phosphorus and fluorine;
wherein the peripheral core region has higher concentrations of phosphorus and fluorine than the center core region.

In some implementations:
the rare-earth center dopant consists of ytterbium;
the center co-dopants consist of phosphorus and aluminum; and
the peripheral dopant consists of phosphorus;
wherein the center core region and the peripheral core region have about a same concentration of phosphorus.

In some implementations, the core has a diameter between about 20 µm and about 60 µm and a core numerical aperture between about 0.06 and 0.10. A ratio of a diameter of the center core region to the diameter of the core may range from about 0.5 to about 0.9.

In some implementations, the one or more claddings surrounding the core comprise:
an inner cladding configured to confine a light beam in the core; and
an outer cladding configured to confine a pump light in the inner cladding.

In some implementations, an output light beam exiting from an end of the optical fiber has a beam quality factor M2 less than or equal to about 1.3.

In some implementations, the active LMA optical fiber further comprises stress-applying members extending longitudinally within at least one of the one or more claddings.

Other features and advantages will be better understood upon of reading of detailed embodiments with reference to the appended drawings.

BRIEF DESCRIPTION OF THE DRAWINGS

FIGS. 4A and 4B schematically represent the cross-sectional view and refractive index profile of the core and claddings of an active LMA optical fiber according to one embodiment, where the refractive index of the second cladding is higher than the refractive index of the first cladding.

DETAILED DESCRIPTION

In accordance with some aspects, there is provided an active LMA optical fiber which mitigates the effects of TMI when used as the gain medium of a fiber amplifier or laser system.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the present description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In the present description, when a broad range of numerical values is provided, any possible narrower range within the boundaries of the broader range is also contemplated. For example, if a broad range value of from 0 to 1000 is provided, any narrower range between 0 and 1000 is also contemplated. If a broad range value of from 0 to 1 is mentioned, any narrower range between 0 and 1, i.e. with decimal value, is also contemplated.

Figure 2A:
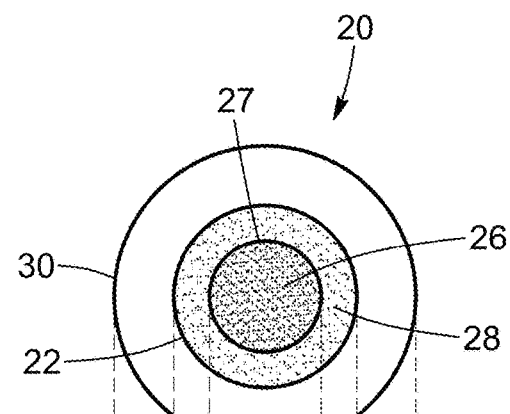
FIGS. 2A, 2B and 2C schematically represent a cross-sectional view, the refractive index profile and the temperature coefficient profile, respectively, of the core of an active LMA optical fiber according to one embodiment.
Figure 2B:
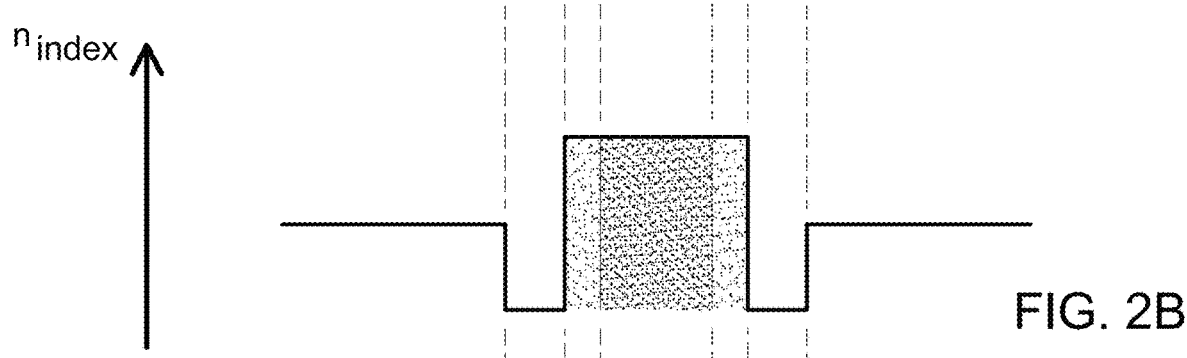
Figure 2C:
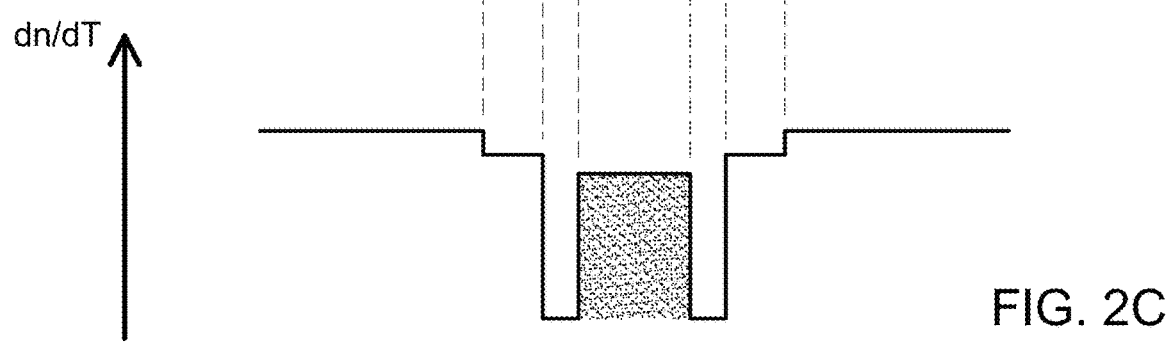

Referring to FIGS. 2A, 2B and 2C, the transverse structure, refractive index profile and temperature coefficient profile of a portion of an active LMA optical fiber 20 according to one implementation are schematically illustrated.

Figure 3A:
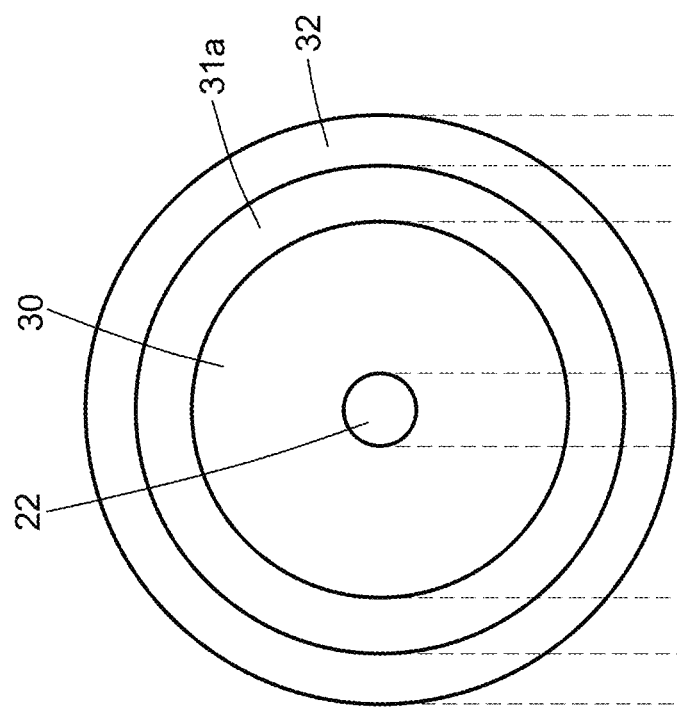
FIGS. 3A and 3B schematically represent the cross-sectional view and refractive index profile of the core and claddings of an active LMA optical fiber according to one embodiment.
Figure 3B:
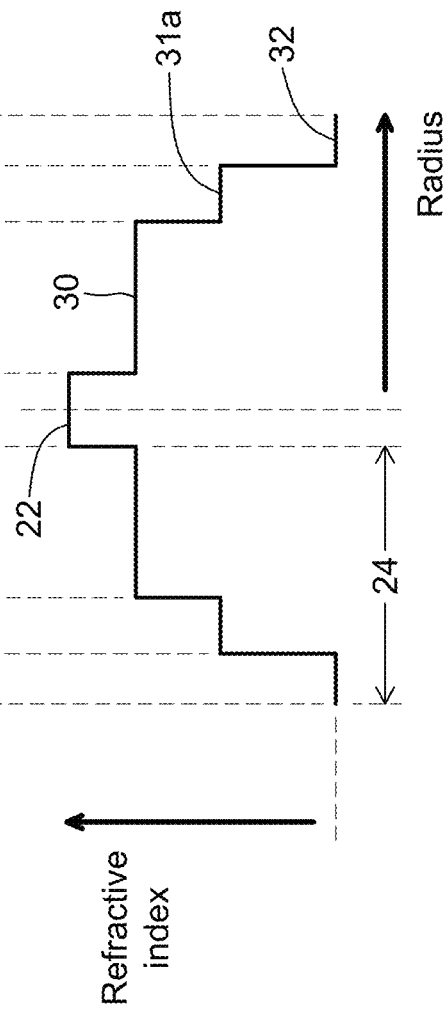

The active LMA optical fiber 20 includes a core 22 and one or more claddings 30, forming a cladding structure 24 (see FIGS. 3A and 3B), surrounding this core. In some embodiments, the active LMA optical fiber 20 may be a multi-clad optical fiber used to amplify a light beam in devices such as fiber lasers and amplifiers. Such devices are used in a wide range of optical applications in fields such as medicine and surgery, scientific instrumentation, semiconductor device manufacturing, military technology, and industrial material processing. In some variants, the active LMA optical fiber may include stress-applying members extending longitudinally within at least one of the one or more claddings on each side of the core so as to maintain the polarization of light in a linear state, such a fiber being known in the art as panda or bow-tie polarization-maintaining fiber. Such specialty fibers are used in fiber lasers and amplifiers in some of the fields listed above, for instance where a specific application requires the light to be linearly polarized. The generation of laser frequency harmonics using nonlinear optical crystals is a first instance where linearly-polarized light is required, chirp-pulse amplification using grating pair pulse compressors in ultrafast lasers being another instance.

Parameters of the active LMA optical fiber 20 such as the respective composition, size and configuration of the core 22 and of the one or more claddings of the cladding structure 24 may be selected in view of the intended use of the fiber. As known in the art, the core 22 is configured to support the propagation of a light beam to be amplified in a fundamental core mode of the typically few-mode active LMA optical fiber 20 while the claddings 24 are configured to confine the light beam in the core 22. When the active LMA optical fiber is used in a cladding-pumped implementation, at least one of the claddings 24 may also be configured to support and guide the optical pump beam in one or more cladding modes. Examples of cladding configurations are provided further below. In some implementations, the output light beam exiting from the end of the optical fiber has a beam quality factor $M^2$ less than or equal to about 1.3.

In accordance with some implementations, the core includes a center core region 26 and a peripheral core region 28 contiguously surrounding the center core region 26. The center core region 26 has a center core glass composition comprising at least one rare-earth center dopant and one or more center co-dopants. The peripheral core region 28 has a peripheral core glass composition which is free of rare-earth dopants and comprises one or more peripheral dopants.

As is known in the art, the core has a refractive index and a temperature coefficient each having a radial profile along the transverse direction. The refractive index profile of a glass material is determined by the composition and distribution of the dopants in the glass host. In accordance with one aspect, the core 22 of the active LMA optical fiber 20 described herein has a generally continuous refractive index profile across a boundary 27 between the center core region 26 and the peripheral core region 28. As one skilled in the art will readily understand, the expression "generally continuous" allows for some manufacturing artefacts in the refractive index profile at the boundary 27, inasmuch as such artefacts have a negligible impact on the optical modes guided by the fiber for the targeted application. Furthermore, the temperature coefficient of the peripheral core region 28 is lower than the temperature coefficient of the center core region 26. As explained below, in some implementations, radially dependent but azimuthally uniform concentrations of co-dopants over the cross-sectional area of the core 22 may advantageously be used to lessen the susceptibility of the active LMA optical fiber to TMI when the heat load in the fiber becomes considerable.

The susceptibility of optical fibers to TMI under an increasing heat load is believed to depend on characteristics such as the thermal conductivity, the heat capacity and the temperature coefficient of the glass materials of the optical fiber. The temperature coefficient is also referred to in the art as the thermo-optic coefficient. The temperature coefficient refers to the tendency of the refractive index of a glass material to change while the material is heated or cooled. The temperature coefficient is also symbolized in the literature as the parameter dn/dT, n being the refractive index of the material and T the temperature. The temperature coefficient depends on the glass host composition, with regards to the addition of dopants (aluminum, phosphorus, fluorine, . . . ) and their respective concentrations in the glass.

In conjunction with rare-earth dopants provided in the core of an optical fiber to generate optical gain, co-dopants are typically included in the fabrication of active fibers for several reasons, such as (i) increasing the solubility of rare earths ions in the glass host; (ii) controlling the refractive index contrast between the core and the adjacent cladding; and (iii) reducing the susceptibility of the fiber to photo-darkening. In accordance with one aspect, the dopants in the core of the active LMA optical fibers described herein are additionally or alternatively used to control the temperature coefficient profile of the glass host.

In some implementations, the center core glass composition includes a glass host such as silica glass, and at least one rare-earth center dopant such as ytterbium ($Yb^{3+}$), neodymium ($Nd^{3+}$), erbium ($Er^{3+}$), thulium ($Tm^{3+}$), praseodymium ($Pr^{3+}$) and holmium ($Ho^{3+}$). The center core glass composition further includes one or more center co-dopants, which may for example be embodied by aluminum, phosphorus, fluorine, or combinations thereof. The rare-earth center dopants and the center co-dopants have respective concentrations and distributions determining the radial refractive index profile of the core 22 within the center core region 26. The peripheral core glass composition of the peripheral core region 28 also includes a glass host such as silica glass. However, in contrast to the glass composition of the center core region 26, it is free of rare-earth dopants. The peripheral core glass composition includes one or more peripheral dopants, for example, phosphorus oxide and/or fluorine, having respective concentrations and distributions determining the radial refractive index profile within the peripheral core region 28.

In the present description, the dopants and co-dopants can be referred to as using the chemical element name of the corresponding active element. For instance, one can refer to "aluminum" or "phosphorus" co-dopants, and to "ytterbium" dopant. One skilled in the art will understand that such elements are present in the optical fiber in their oxide form. Hence, the terms "aluminum" and "aluminum oxide" co-dopant can be used interchangeably. Similarly, the terms "phosphorus" and "phosphorus oxide" co-dopant can be used interchangeably. Regarding the rare earth dopants, such as ytterbium for instance, one will use the terms "ytterbium", "$Yb^{3+}$", "ytterbium oxide", and "$Yb_2O_3$" interchangeably.

In accordance with one aspect, the configuration and composition of the core 22 are designed such that the temperature coefficient of the peripheral core region is lower than the temperature coefficient of the center core region. Such a core 22 advantageously combines the following features:

i. The confinement of the rare earth dopants in the center region promotes the fundamental mode ($LP_{01}$), while the higher-order modes are deprived from the gain otherwise needed for the TMI to thrive;

ii. The coupling between the fundamental mode ($LP_{01}$) and the next higher-order mode ($LP_{11}$) is reduced as the temperature coefficient is made lower in the peripheral core region, where the overlap between these two modes is the greatest, given the heat load in the active fiber.

Figure 1:
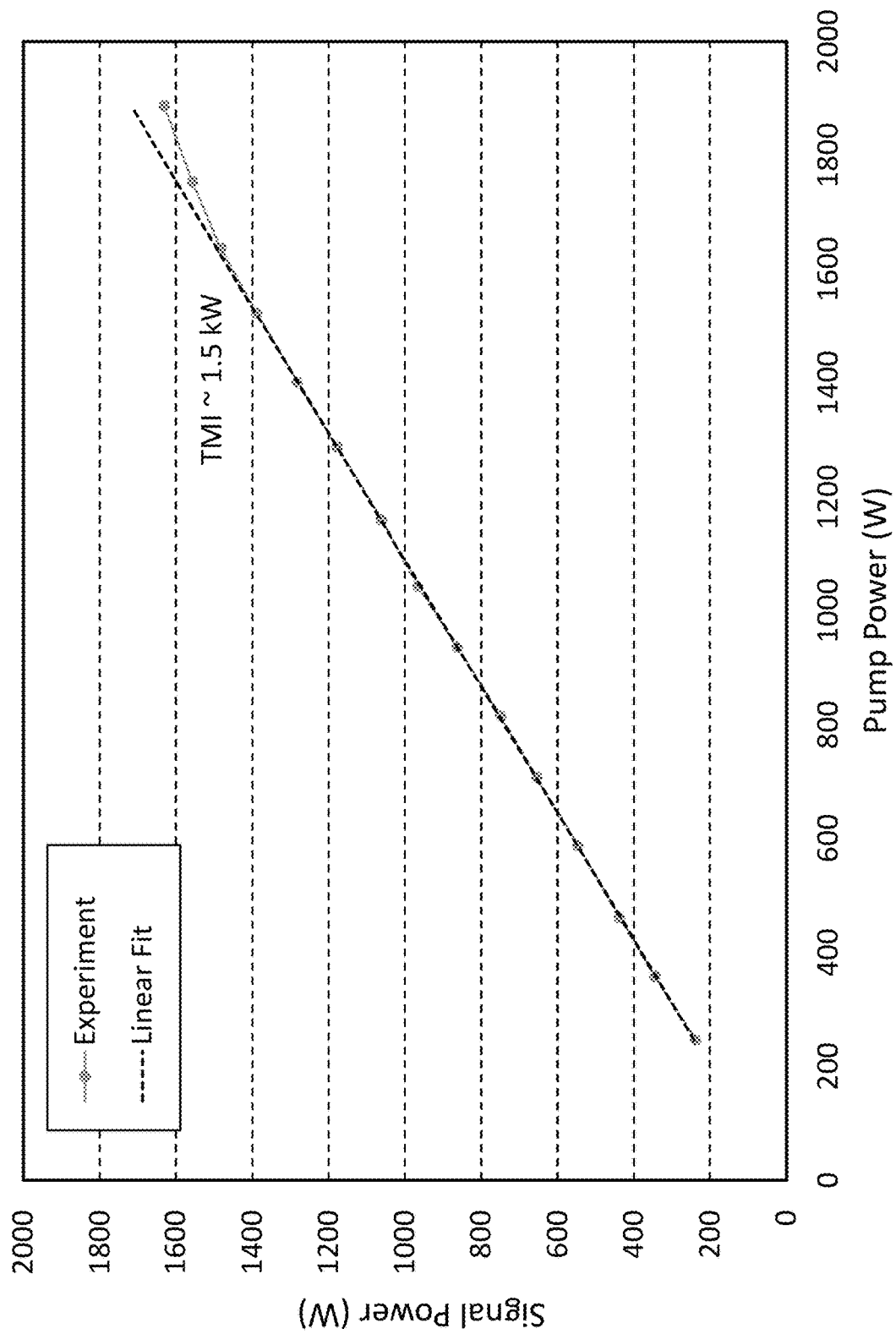
FIG. 1 (PRIOR ART) is a graph of the laser slope efficiency beyond the TMI threshold using a conventional polarization-maintaining 20/400 LMA fiber.

As will be understood by one skilled in the art, these two complementary measures can prevent TMI from taking place in LMA fibers used in fiber lasers and fiber amplifiers. Beside from the roll-off seen on the output power of fiber lasers and amplifiers (see FIG. 1), the TMI onset may also be identified from intensity fluctuations that will show up on signal samples recorded using a fast photodiode on which is directed the laser beam outputted by the active LMA optical fiber. Distinct frequencies usually stand out from a Fourier analysis performed on the signal temporal traces, seen as evidence for the coherent beating between the fundamental mode ($LP_{01}$) and the first higher-order mode ($LP_{11}$) which is taking place as TMI unfolds. Compared to an equivalent optical fiber having an equivalent core with a same core diameter as the active LMA optical fibers described herein and a continuous temperature coefficient profile across this equivalent core, the threshold for TMI as determined from the aforementioned characteristics is expected to increase by a significant measure, e.g. in some implementations the threshold may be raised by a factor of about 30% or more, in some other implementations the threshold may be raised by about 50% or more while in yet other implementations the threshold may be raised by as much as 100% or more. Precisely how much is the TMI threshold raised depends on how much lower is the temperature coefficient in the peripheral core region as compared to the temperature coefficient in the center core region. By way of example, the temperature coefficient in the peripheral core region may be about 5% to about 35% lower than the temperature coefficient in the center core region. In some implementations, the temperature coefficient in the peripheral core region is about 5% lower than the temperature coefficient in the center core region, in some other implementations, the temperature coefficient in the peripheral core region is at least 10% lower than the temperature coefficient in the center core region while in still other implementations the temperature coefficient in the peripheral core region is at least 20% lower than the temperature coefficient in the center core region.

Still referring to FIGS. 2A, 2B and 2C, and with further reference to FIGS. 6A to 6D, in some implementations the core 22 of the active LMA optical fiber 20 is shown to consist of two distinct concentric regions, embodying the center core region 26 and the peripheral core region 28. The center core region 26, which is doped with active ions such as rare earth ions, for example $Yb^{3+}$, and other co-dopants (e.g., Al, P, F, . . . ), is bounded by the peripheral core region 28. The composition of the peripheral core region 28 may be chosen so as to produce a refractive index about the same as the refractive index of the center core region 26, yet with a temperature coefficient which is lower than that of the center core region 26. As mentioned above, this is preferably achieved by including one or more peripheral dopants in the peripheral core region 28. Preferably, at least one peripheral dopant is a temperature-coefficient-reducing dopant providing a negative contribution to the temperature coefficient, that is, the temperature coefficient of the peripheral core region is lower than it would be without the presence of this particular dopant. In some variants, the weighted mean of the molar refractivities of the one of more peripheral dopants is about the same as the weighted mean of the molar refractivities of the rare-earth center dopants and center co-dopants found in the center core region. By way of example, Table 1 below provides values of the molar refractivity Δn and temperature coefficient of silica and typical glass dopants.

TABLE 1

| Material | Δn ($\cdot 10^{-4}$ mol %$^{-1}$) | dn/dT ($\cdot 10^{-6}$ K$^{-1}$) |
|---|---|---|
| $SiO_2$ | — | 10.4 |
| $GeO_2$ | 13 | 19.4 |
| $Al_2O_3$ | 23 | 10.5 |
| $P_2O_5$ | 9.3 | -13.3 |
| $AlPO_4$ | -0.9 | N/A |
| F | -8 | -1.1 |
| $B_2O_3$ | -5 | -30 |

Figure 7B:
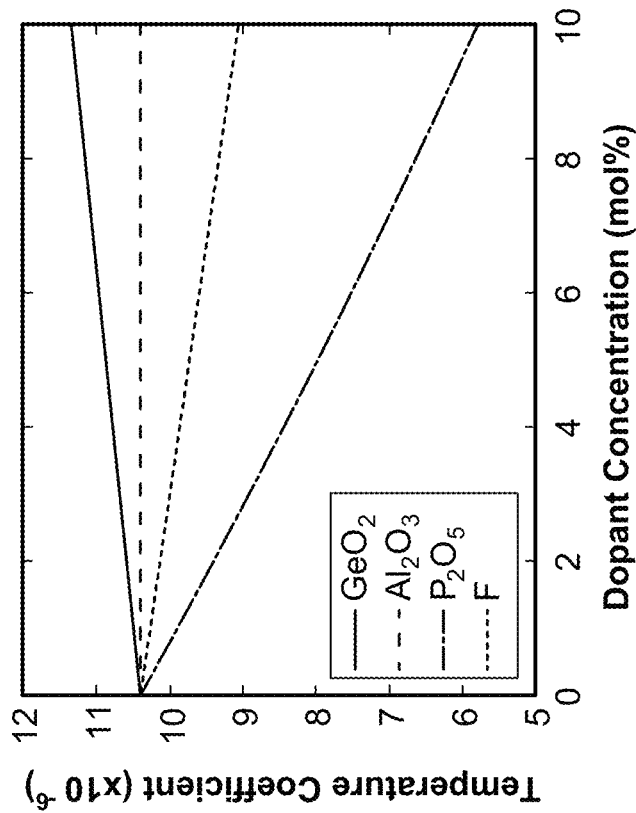
FIG. 7A is a graph of the refractive index and FIG. 7B is a graph of the temperature coefficient of silica glass compounds vs. dopant concentration.
Figure 7A:
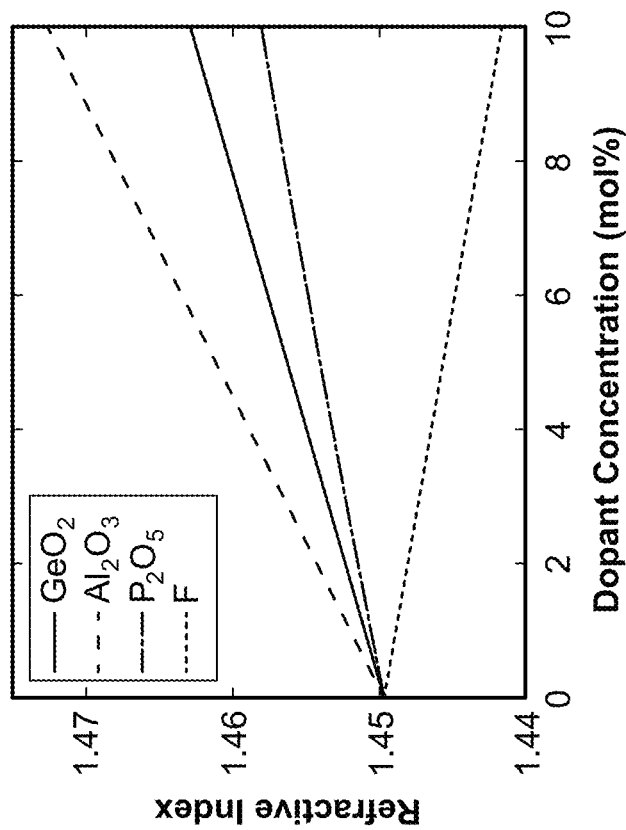
Figure 8A:
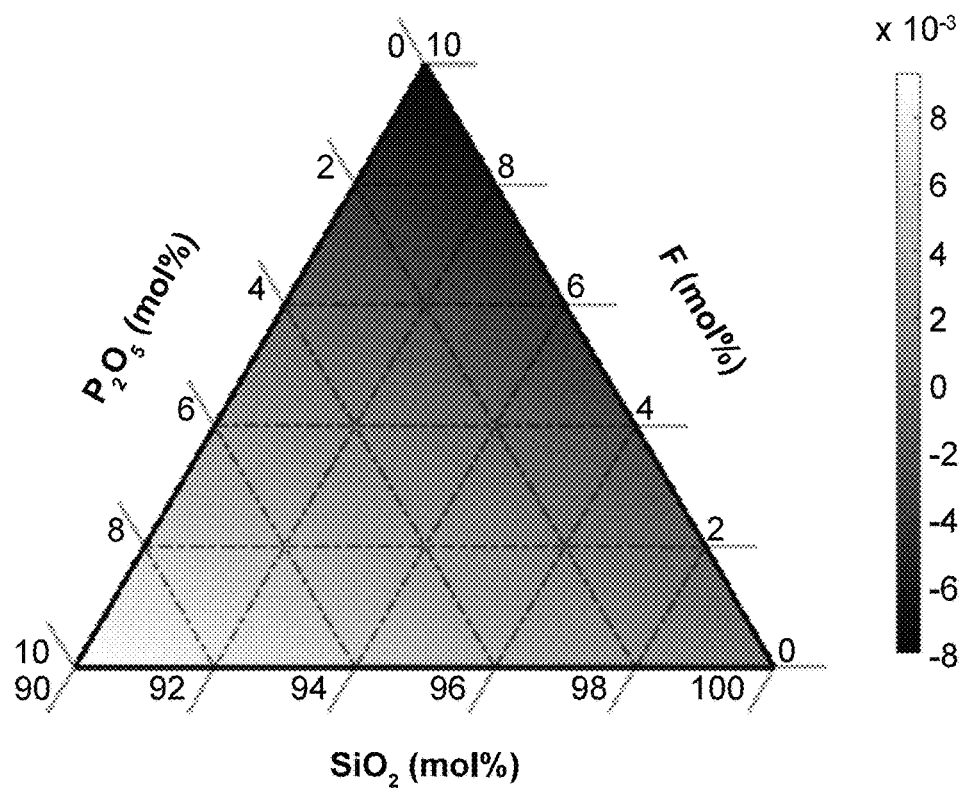
FIGS. 8A and 8B are ternary diagrams of the refractive index change relative to pure silica (8A) and the temperature coefficient (8B) of glass with molar concentrations of phosphorus and fluorine dopants.
Figure 8B:
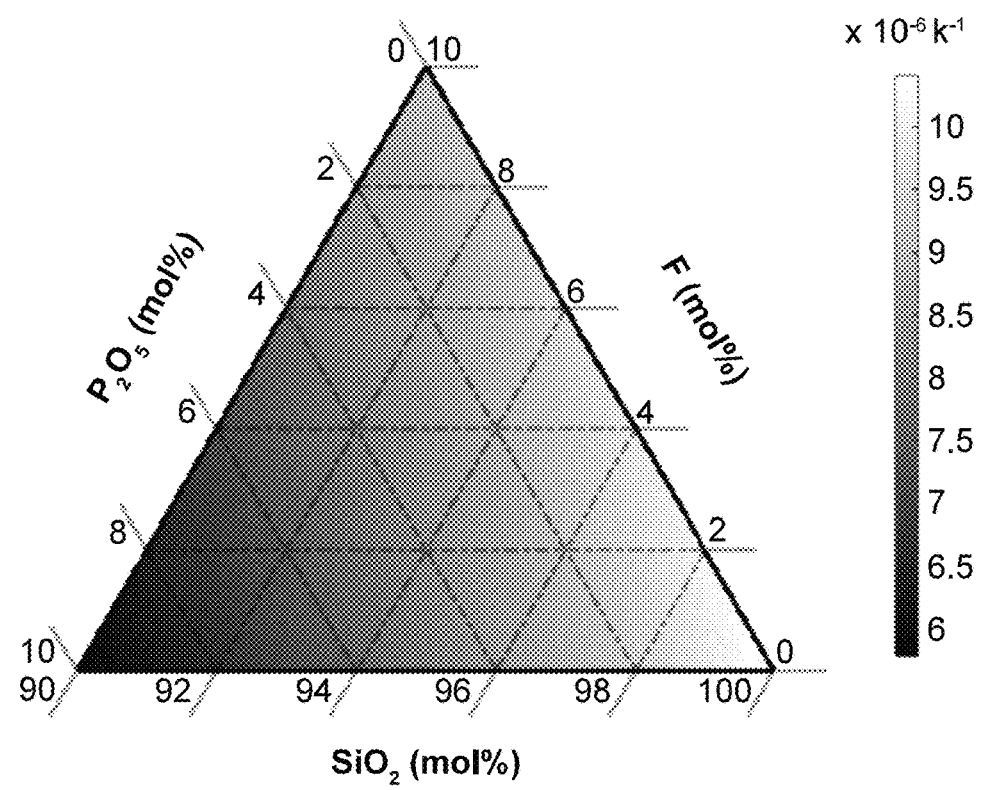
Figure 9A:
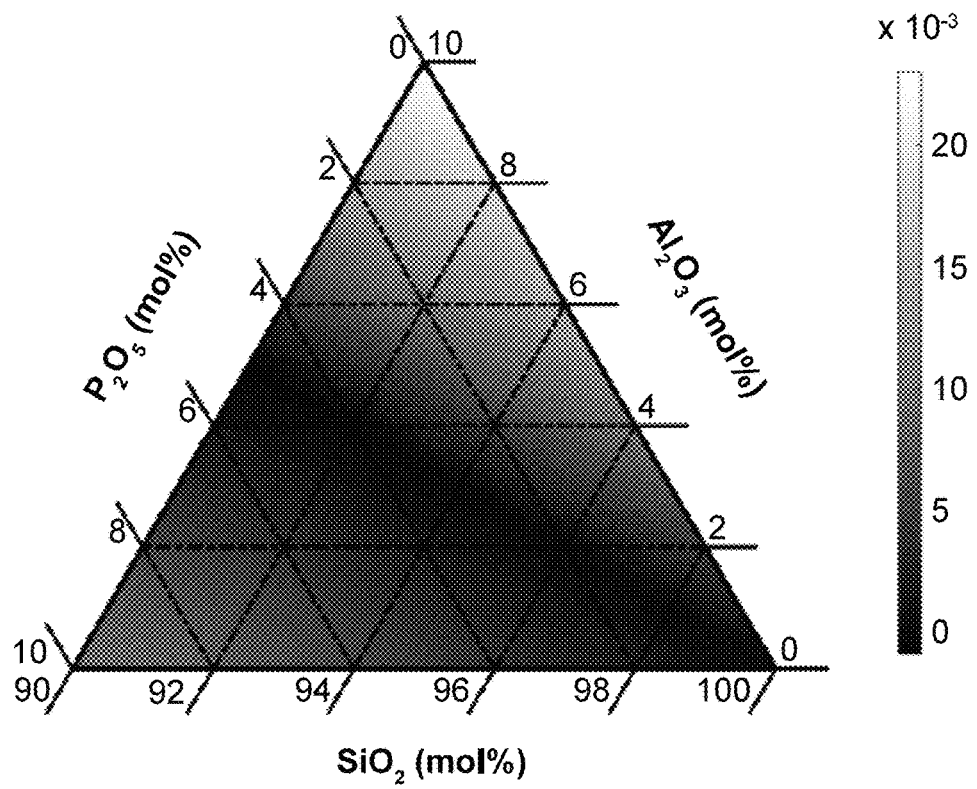
FIGS. 9A and 9B are ternary diagrams of the refractive index change relative to pure silica (9A) and the temperature coefficient (9B) of glass with molar concentrations of phosphorus and aluminum dopants.
Figure 9B:
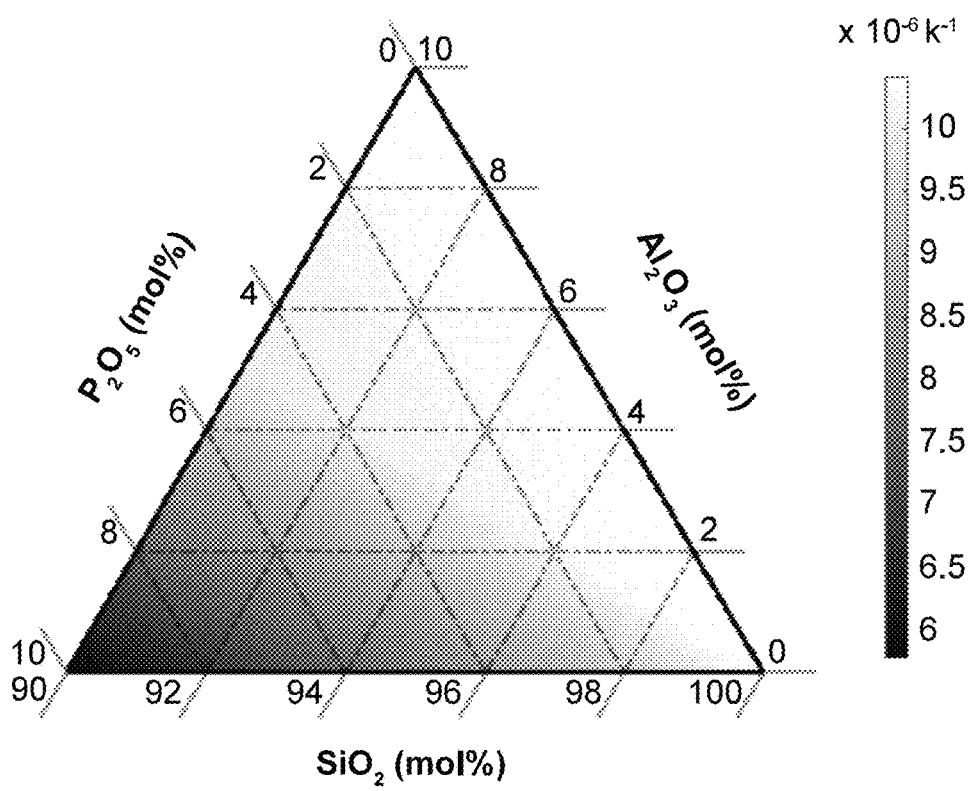

Reference can also be made to FIGS. 7A and 7B, respectively showing the refractive index and temperature coefficient of various silica glasses including different dopant compounds as functions of the molar concentrations of the dopants. Furthermore, ternary diagrams of the refractive index change relative to pure silica and the temperature coefficient of glass with molar concentrations of dopants are shown in FIGS. 8A and 8B for phosphorus oxide and fluorine dopants, and on FIGS. 9A and 9B for phosphorus oxide and aluminum oxide dopants.

Figure 6A:
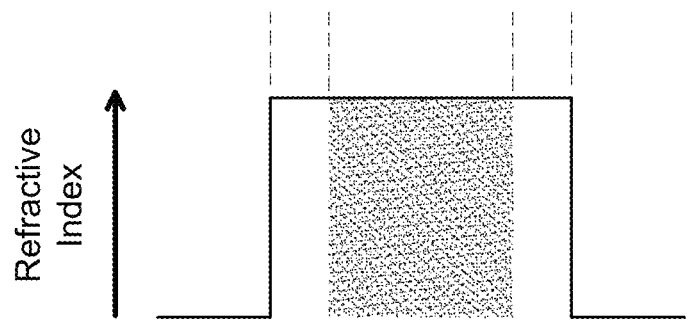
FIGS. 6A and 6B respectively illustrate a uniform core refractive index and a non-uniform core temperature coefficient profile that can be obtained using radial profiles of molar compositions of dopants such as shown in FIGS. 6C and 6D.
Figure 6B:
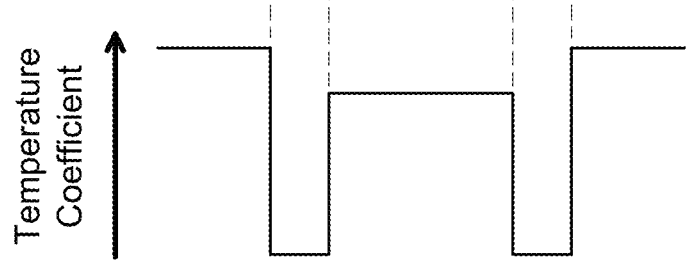
Figure 6C:
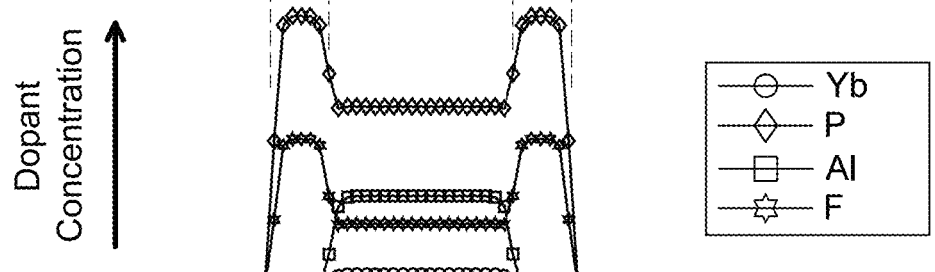
Figure 6D:
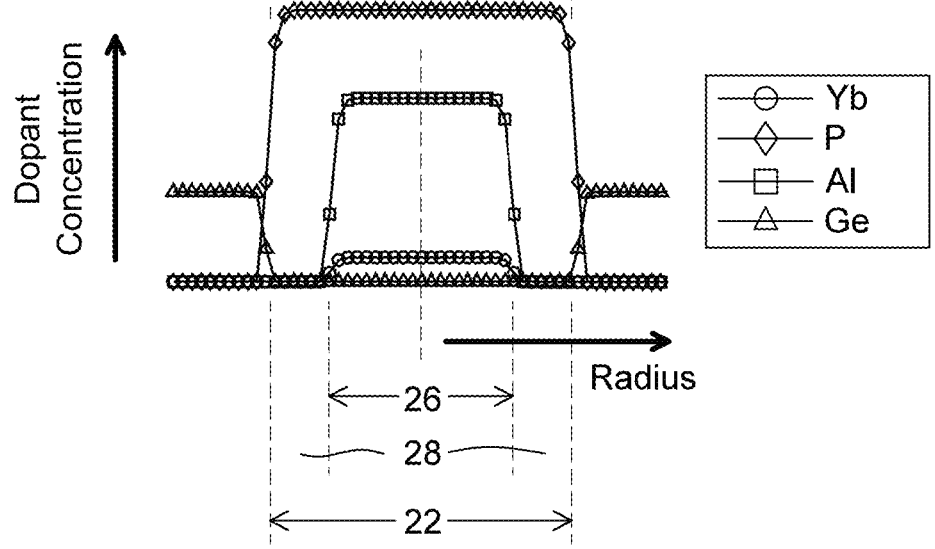

By way of example, FIGS. 6C and 6D illustrate the molar compositions of two active LMA optical fiber samples producing a same non-uniform temperature coefficient (FIG. 6B) and a uniform core refractive index (FIG. 6A). For instance, the phosphorus oxide/fluorine-enriched peripheral core region 28 in the fiber depicted in FIG. 6C, with a temperature coefficient lower than that of the center core region, will contribute less to the refractive index grating induced by the heat load and mode coupling will be reduced accordingly. Phosphorus oxide and fluorine appear as a good match as their respective molar refractivities nearly offset each other. As an example, if an excess of phosphorus oxide and fluorine is added to the peripheral core region, the temperature coefficient will then be about 20-40% lower than the temperature coefficient in the center core region, given the maximum molar concentrations (i.e., 5-10 mol %) that can be achieved with standard fabrication means (i.e., vapor deposition and solution doping). Beside fluorine, boron oxide may also be used in addition to phosphorus oxide. Boron oxide may add up to phosphorus oxide, exerting altogether a greater influence on the temperature coefficient. Nonetheless, boron oxide concentration will differ from fluorine concentration as the molar refractivity of boron oxide, unlike fluorine, does not nearly offset the contribution of phosphorus. At last, phosphorus oxide may yield on its own (i.e., without fluorine) a temperature coefficient of the peripheral core region that is lower than the temperature coefficient of the center core region, provided that the molar compositions are chosen adequately (see for example FIG. 6D).

Figure 5A:
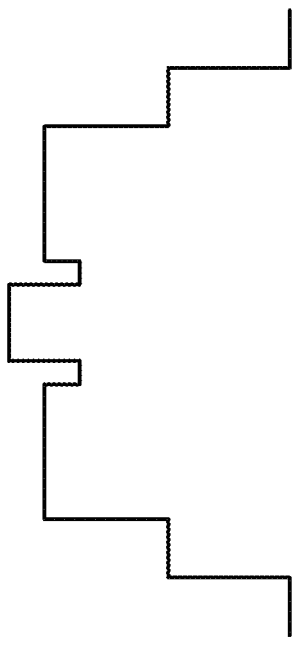
FIGS. 5A to 5C are schematic representations of active LMA optical fibers with multiple claddings and different core refractive index profiles.
Figure 5B:
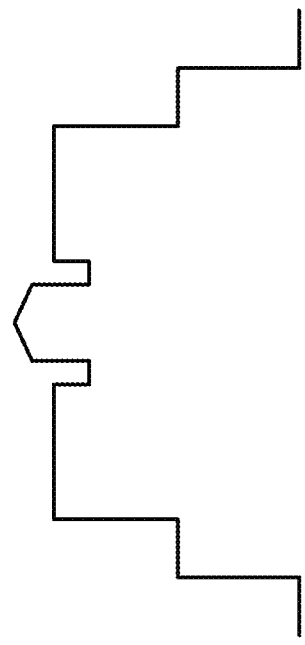
Figure 5C:
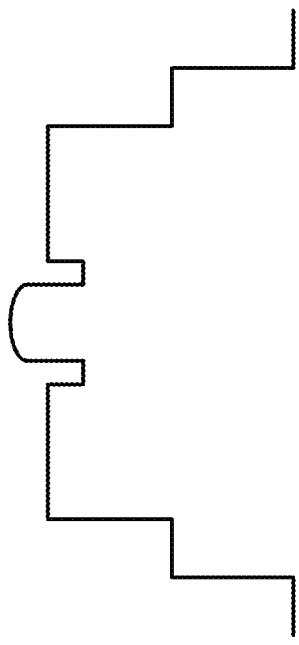

In some implementations, such as for example shown in FIG. 5A, the center core and peripheral core glass compositions may each be radially uniform. As such, the refractive index of the core has a same uniform value across the center core region and the peripheral core region, and the temperature coefficient has a first uniform value across the center core region and a second uniform value across the peripheral core region, leading to the temperature coefficient profile forming a step function at the boundary between the center core region and the peripheral core region. In other variants, a graded radial profile of the temperature coefficient may be provided through a varying concentration of the peripheral dopants in the peripheral core region, assuming that such a radially-varying dopant concentration is made possible by the technique chosen for the fabrication of the fiber preform. Likewise, the refractive index in the core could assume a graded radial profile, without departing from the scope of protection. A linear (see FIG. 5B) or parabolic (see FIG. 5C) refractive index profile may be desirable, for instance with the intent of minimizing the coupling between the fundamental mode and the higher-order modes.

Referring by way of example to FIGS. 3A, 3B, 4A, 4B and 5A to 5C, there are shown various configurations for the cladding structure 24 of active LMA optical fibers 20 according to various implementations. As mentioned above, the active LMA optical fiber 20 may feature the presence of several claddings. Preferably, at least one of the claddings, typically the first cladding immediately surrounding the core 22 and sometimes referred to as the "inner cladding" 30, has a refractive index lower than that of the core, providing means to confine the light beam in the core. The inner cladding 30 typically consists of fused silica and may sometimes include index modifiers such as germanium to raise the refractive index above that of fused silica, or fluorine to lower the refractive index. Referring by way of example to FIGS. 2A and 2C, the inner cladding 30 may have a temperature coefficient which is higher than the temperature coefficient of the peripheral core region 28. While this is not essential, the larger temperature coefficient in the first cladding relative to that of the core peripheral region may be beneficial for the filtering of higher-order modes as the thermal load increases in the fiber core. For instance, in the case where the first cladding has a depressed refractive index with respect to the subsequent cladding (following the teachings of Paré et al. in U.S. Pat. No. 8,731,358), this same cladding could be made such as to have a temperature coefficient larger than that of the core peripheral region, thereby improving bending losses.

An outer cladding 32 typically surrounds the inner cladding, the material of the outer cladding 32 often consisting of a low-index acrylate polymer, providing means to confine the pump light within the inner cladding with a numerical aperture (NA) of at least 0.46. One or more intermediate claddings 31 of various thicknesses may be provided between the inner 30 and outer 32 claddings, with values for their refractive indices ranging from that of the core 22 to that of the outer cladding 32. One such intermediate cladding 31b could be made of silica glass doped with fluorine (e.g., Fluosil®) and may be provided immediately inward of the outer cladding 32, thereby providing means to confine pump light with NA=0.22. In addition or alternatively, an intermediate cladding 31a having a refractive index larger than that of the inner cladding 30 may be provided immediately outwards of the inner cladding 30, providing means to modify the waveguide properties in the core 22, such as for example taught in U.S. Pat. No. 8,731,358 (Pare et al), the entire contents of which is incorporated herein by reference.

By way of example, in the embodiment illustrated in FIGS. 4A and 4B, the active LMA optical fiber configuration includes a first cladding 30 featuring a depressed refractive index, which may be conducive to a better mode stability. The active fiber illustrated in FIGS. 3A and 3B, where each cladding is shown to have a refractive index smaller than the previous cladding, may also be used.

The outer diameter of the fiber (by convention without the outermost cladding) is preferably in the range from 125 to 600 µm. In some implementations, the diameters of the claddings could be made to change periodically along the fiber, for instance if the fiber is pulled as a taper during fiber drawing (see the teachings of Roy et al. in U.S. Pat. No. 10,985,519). Finally, the outermost cladding of the active LMA optical fiber is typically coated with a polymer layer to provide means for protecting the fiber against environmental influences.

Examples and Additional Considerations

The extent of the rare earth doped cross section of the center core region, or inversely the rare-earth dopant confinement ratio, depends on several parameters, including the core and the cladding diameters, the concentration of rare-earth dopants in the glass host, and the mode field diameter of the light beam in the core of the active LMA optical fiber. As known in the art, the mode field diameter of the light beam relates to the main purpose of active LMA fibers, i.e., to amplify laser beams at high powers and yet avoid distortions induced by the high intensity of the mode field in the fiber core leading to the onset of nonlinear effects. The mode field tends to be more tightly confined within the core as the core diameter gets larger, or if the heat load is increased. For instance, considering a step-index fiber with core diameter $d_{core}$ and numerical aperture $NA=\sqrt{n_{core}^2-n_{clad}^2}$, Marcuse equation yields the mode-field diameter MFD for the fundamental mode $LP_{01}$ as:

$$MFD = d_{core} \cdot (0.65 + 1.619/V^{3/2} + 2.879/V^6) \quad (1)$$

where $V$ ($=\pi d_{core} NA/\lambda$) is the normalized frequency of the fiber and $\lambda$ is the wavelength of light in vacuum. The larger the normalized frequency, the smaller the mode field diameter relative to the core diameter (i.e., V>>yields MFD→0.65 $d_{core}$ in equation (1) above). In essence, as the core diameter gets larger, the more the rare-earth dopants are to be confined in the center region to achieve the desired light amplification. On the other hand, too great a confinement requires rare earth concentrations exceeding the restrictions set by clustering and photodarkening in the glass host, both effects causing the laser slope efficiency to decrease and the excess heat to be transferred to the laser gain media. The absorption of pump light in rare-earth-doped double-clad fibers is obtained as the product of the absorption cross-section $\sigma_{abs,pump}$ with the density of rare-earth dopants $N_{re}$, taking into account the overlap $\eta_{pump}$ of the pump light propagating in the cladding (assumed to be evenly distributed) with the cross-sectional area of the center core region doped with rare earths:

$$abs = \eta_{pump} \cdot \sigma_{abs,pump} \cdot N_{re} \quad (2)$$

where $\eta_{pump}=A_{re}/A_{clad}(\propto d_{re}^2/d_{clad}^2)$, and $A_{re}$ and $A_{clad}$ refer to the cross-sectional areas of the rare-earth core dopants (hence of the center core region) and cladding respectively. In typical optical fibers, where there is no confinement of rare-earth dopants, the extent of the doped region is then considered the same as the core diameter ($d_{re}=d_{core}$). The absorption cross-section of rare earths in the glass host depends on the concentrations of center co-dopants used in the center core region to increase the solubility of rare earths ions in the glass host (solutizer ions). In fact, the absorption cross-section is known to change more or less given the specific laser wavelength used for optical pumping (e.g., 915-976 nm for ytterbium) depending on which solutizer ions are being used in the glass host, for example whether it is aluminum, phosphorus, or both. The density of rare-earth dopants is generally in the range of about $10^{25}$-$10^{26}$ ions/m³.

In general, LMA fibers with core diameters in the range $d_{core} \approx 20$-30 µm and numerical aperture NA≈0.065 are found to have normalized frequencies in the range V≈4-6. LMA fibers drawn as tapers were reported to have $d_{core} \gtrsim 50$ µm and normalized frequency V≥10 at the distal end (see the teachings of Roy et al. in U.S. Pat. No. 10,985,519). The active LMA optical fiber described herein preferably has a core diameter $d_{core} \approx 20$-60 µm and core numerical aperture NA≈0.06-0.10. The cladding diameter $d_{clad}$ is generally selected from a few standard sizes to match the fiber-optic components currently used by laser system engineers (i.e., 125, 250, 400 and 600 µm). The latter depends first and foremost on the power and brightness of the pump light to be launched in the fiber cladding but also the amplifier output power required to meet the user's needs for specific applications.

Given the figures mentioned herein, confinement ratios ($=d_{re}/d_{core}$) ranging from about 0.5 to 0.9 are reasonable for active LMA optical fibers according to some embodiments. Too small a confinement ratio may result in excessively low absorption of pump light due to limitations on concentrations of rare earth dopants, which in turn involves long fibers and nonlinear effects showing up at an early stage. For instance, a confinement ratio of 0.5 involves a concentration of rare earth dopants roughly 4× greater for pump absorption to stay the same as for a fiber having a core doped with the same rare earths over its full transverse section.

Fiber preforms for the drawing of active LMA optical fibers as described herein may be fabricated using conventional processes, such as modified chemical vapor deposition (MCVD) and solution doping, even though additional process steps may be required before the fiber preform is completed and made available for fiber drawing. Chemical vapor-phase deposition process with chelate precursors alleviates some of the complexity as much greater control is provided to tailor both the refractive index and the temperature coefficient simultaneously, especially to address more complex radial profiles such as the ones illustrated in FIG. 5. In some implementations the stack-and-draw fabrication technique may also be used, with even greater precision on the final radial profiles of refractive index and temperature coefficient as the procedure of drawing stacked preforms can be repeated until the desired structure and dimensions are achieved (with the macroscopic rods/capillaries used in the first place now transformed to submicron scale). The molar concentrations of dopants found in the various regions, or more precisely their respective oxide compounds, will be added to the fiber preform during its fabrication in accordance with both the refractive index profile and the temperature coefficient profile that are sought, provided that the molar refractivity and temperature coefficient of each oxide compound are known. Graded profiles may be achieved for instance by increasing or decreasing the concentration of at least one of the center and peripheral dopants radially outward from the center of the core. Optical fibers with varying dopant concentrations along the core radius may be fabricated with a vapor-phase doping method using chelate precursors, as known in the art, or else from the stack-and-draw method where the final preform stack includes glass rods derived from a plurality of preforms.

As mentioned above, the temperature coefficient of silica glass depends on the nature and concentration of the co-dopants included therein. Some compounds like germanium oxide ($GeO_2$) will raise the temperature coefficient of silica glass while others like phosphorus oxide ($P_2O_5$) will result in a lower temperature coefficient. Properties of optical glasses such as the refractive index and temperature coefficient may be described with the additivity model known in the art, where the aggregate glass properties are obtained from the weighted mean of the individual oxide properties, the weights being the oxide fractional volumes in the glass. Conventional fabrication methods (e.g., MCVD) do not necessarily allow for the addition of co-dopants with arbitrarily high concentrations in the silica glass host. It is, however, possible to make use of various co-dopants with differing temperature coefficients to lessen the impact of the heat load (symbolized here as the temperature elevation $\delta T$). First, as mentioned previously, this is done most simply through tailored glass compositions including co-dopants with a negative contribution to the temperature coefficient such as phosphorus oxide. In addition, the use of a core configuration as disclosed herein may further reduce TMI effects. The radially decreasing temperature coefficient $$\frac{dn(r)}{dT}$$

so produced seeks to minimize the coupling taking place from the fundamental mode ($LP_{01}$) to the next higher-order mode ($LP_{11}$), accounted for by the overlap integral in the equation below:

$$c_{RIG} = n_0 k_s \int\int \psi_{01}(r,\varphi) \frac{dn(r)}{dT} \delta T(r,\varphi) \psi_{11}(r,\varphi) \qquad (3)$$

where $n_0$ is the refractive index of the glass host and $k_s$ is the wavenumber of the light propagating in the fiber. The TMI threshold is further expected to vary inversely with the coupling strength $c_{RIG}$ once the index grating is initiated as the result of the mode interference pattern at some location along the fiber. Hence, a 50% decrease in coupling strength $c_{RIG}$ should raise the TMI threshold roughly by a factor of 2. In some embodiments, active LMA optical fibers as described herein have a coupling coefficient less than equivalent fibers without the claimed core configuration by at least a factor of 2, which yields a significant advantage over conventional LMA fibers.

The molar composition in the peripheral core region largely depends on the molar composition in the center core region in order to yield the desired mismatch between the temperature coefficients of both regions. The concentration of rare earth ions, such as ytterbium, in silica glass fibers is limited by adverse effects such as crystallization and clustering. As mentioned above, the solubility of rare-earth dopants in a glass host depends on the addition of one or more center co-dopants such as phosphorus oxide ($P_2O_5$) and/or aluminum oxide ($Al_2O_3$). The addition of both phosphorus and aluminum oxides in the silica host yields a glass system which is sometimes called aluminophosphosilicate glass (APS in short). The refractive index of APS glass depends on the concentrations of P and Al oxides present therein. A P/Al molar ratio of 1:1 is known to yield a slight decrease of the refractive index of the glass because of the formation of aluminum phosphate ($AlPO_4$), having a negative molar refractivity. In practice, it is common for the glass host to feature an excess of phosphorus oxide in the region doped with active ions. Hence, the refractive index in this region is mostly determined by the concentration of excess phosphorus and ytterbium oxides. In some variants, the center core region of the core may additionally include fluorine as an index-lowering agent.

In turn, the concentrations of phosphorus and fluorine (if any) in the peripheral core region may be chosen so as to level the refractive index with that of the center core region while producing a substantial decrease of the temperature coefficient, as mentioned above. According to the data listed in Table 1, the molar refractivities of phosphorus and fluorine almost offset each other while both have negative temperature coefficients. In some embodiments, about equal concentrations of phosphorus and fluorine therefore allow for tailoring the temperature coefficient of the peripheral core region in a way such as to mitigate TMI in high power fiber lasers and amplifiers. Alternatively, an excess of phosphorus in the peripheral core region may be required to produce a uniform refractive index profile in the core. The specific concentration of phosphorus and fluorine not only depend on the rare-earth concentration in the center core region (e.g., ytterbium), but also on the P/Al molar ratio in the center core region and whether the reaction leading to the formation of aluminum phosphate is complete.

Two distinct examples of active LMA optical fibers according to some embodiments are discussed hereinafter.

In both cases, an active LMA optical fiber doped with ytterbium and with a core numerical aperture NA of 0.065 is considered. In the first sample, the distribution of dopants over the core cross section is assumed to be similar to that shown in FIG. 6C. Ytterbium and aluminum are found only within the center core region whereas phosphorus and fluorine span the full extent of the fiber core. The molar composition in the center core region is $0.2Yb_2O_3$-$1.0F$-$2.8P_2O_5$-$1.4Al_2O_3$-$94.6SiO_2$ while the molar composition in the peripheral core region is $2.4F$-$4.2P_2O_5$-$93.4SiO_2$. The number in front of each chemical species refers to the molar concentration in mol % of the species. A molar ratio P/Al about 2:1 is found in the center core region, although the latter could be made as low as 3:2 and even 1:1 in the case where the concentration of ytterbium is large enough. Fluorine in the center core region is adjusted in accordance with the ytterbium concentration and the phosphorus not involved in the formation of aluminum phosphate so that the core NA=0.065. Whether the addition of fluorine in the center core region is necessary depends on the P/Al molar ratio and the core numerical aperture. The concentrations of phosphorus and fluorine in the peripheral core region were further adjusted so that the temperature coefficient in this region could be made about 20% lower than the temperature coefficient in the center core region and yet keep the refractive index uniform over the core cross section, as shown schematically in FIGS. 6A and 6B. In this case, the phosphorus concentration in the peripheral core region is about three times larger than the excess phosphorus in the center core region (i.e., the fraction of phosphorus not participating to the formation of aluminum phosphate). Also, the fluorine concentration in the peripheral core region is about 2.5 times larger than the fluorine concentration in the center core region.

FIG. 6D shows the distribution of dopants over the core cross section of the second fiber sample. Once again, ytterbium and aluminum are found only within the center core region, yet with concentrations higher than in the first sample, whereas, unlike the first sample, only phosphorus spans the full extent of the fiber core. The molar composition in the center core region is $0.3Yb_2O_3$-$4.2P_2O_5$-$2.8Al_2O_3$-$92.7SiO_2$ while the molar composition in the peripheral core region is $4.2P_2O_5$-$95.8SiO_2$. A molar ratio P/Al of about 3:2 is then found in the center core region in the second fiber sample. The 3:2 P/Al ratio means that more aluminum phosphate will likely form after the reaction involving aluminum and phosphorus oxides will take place and less excess phosphorus will remain thereafter. The absolute concentration of phosphorus in the center core region was nonetheless adjusted given the ytterbium concentration and core numerical aperture so that the refractive indices of both the center core region and peripheral core region are nearly equal.

The molar compositions specified for the fiber samples mentioned above are provided by way of example only and different molar compositions could yield similar refractive index and temperature coefficient. The specific realizations are considered non-limiting and variations to the molar ratios discussed herein are considered within the scope of protection. In particular, the concentration values of dopants and co-dopants in various implementations will depend on the concentration of rare earths and, in turn, on the confinement ratio (i.e., the diameter of the center core region relative to the core diameter) and the cladding diameter. The molar compositions specified hereabove correspond to a fiber with a 30/400 µm core/cladding diameter ratio and having a confinement ratio of about 0.7 (which yield a cladding absorption near 0.5 dB/m at 915-nm wavelength). The ternary diagrams for the refractive index and the temperature coefficient illustrated in FIGS. 8A, 8B, 9A and 9B may serve to determine the concentrations of phosphorus, fluorine and aluminum required in the distinct core regions to achieve the desired effect according to the invention disclosed herein. For instance, from the ternary diagram of FIG. 8A it can be seen that the temperature coefficient could be further reduced in the peripheral core region. The ranges of molar concentration used in the ternary diagrams were limited to molar compositions readily achieved using conventional fiber fabrication means such as modified chemical vapor deposition and solution doping. Fabrication techniques like the molten core method and the stack-and-draw method, even if they are much less common, may nonetheless make possible to produce molar compositions with greater co-dopant concentrations and further decrease the temperature coefficient in the center and peripheral core regions. The molar compositions given herein may then be adapted to yield fiber samples different from the fiber samples detailed herein without departing from the scope of the invention described herein.

Beside from the constituents of the core, the molar composition of the inner cladding 30 may include one or more index-raising or index-lowering co-dopants depending on the core refractive index and the core numerical aperture. The co-dopants found in the inner cladding may be chosen so that the temperature coefficient in that region will be greater than the temperature coefficient in the peripheral core region and perhaps even greater than that of the center core region, as shown in FIG. 6B. While it is not essential, an inner cladding having a temperature coefficient larger than the temperature coefficient in the peripheral core region will further help in mitigating TMI. For instance, the inner cladding may assume the molar composition $xF$-$yGeO_2$-$(100-x-y)SiO_2$ where the molar concentrations x and y will be chosen depending on the molar composition of the core. For the fiber samples considered in FIGS. 6A to 6D, the cladding of the first fiber sample consists of silica only (x=y=0, see FIG. 6C) while the cladding of the second fiber sample has the molar composition $1.4GeO_2$-$98.6SiO_2$ (x=0, see FIG. 6D). Once again, the molar compositions are not unique and other dopants could produce similar results.

As will be readily understood by one skilled in the art, the examples described above are provided for illustrative purposes only, and numerous features may be provided and/or combined in variants of the active LMA optical fiber described herein, such as, for example:

(a) A fiber core including rare-earth dopants (ytterbium, erbium, thulium and so on) providing means for amplification of laser beams in several spectral bands given the appropriate pump light is also available.

(b) Solutizer co-dopants (aluminum, phosphorus, and so on) included in the core of the fiber and providing means for increasing rare earth solubility and further avoid clustering and photodarkening.

(c) Index-raising co-dopants (germanium, titanium) and index-lowering co-dopants (fluorine, boron) providing means to tailor the refractive indices in the core and cladding(s) of the fiber.

(d) Multiple claddings surrounding the core and providing means to confine the pump light in the fiber. The claddings have thicknesses and refractive indices appropriate for efficient launching of pump light given its power and brightness.

(e) Stress-applying members (e.g., boron-doped silica rods) providing means to maintain the light polarization along a linear axis given the induced birefringence in the fiber core.

(f) Frustoconical sections along the fiber with straight sections in-between, obtained by tapering the preform glass melt during fiber drawing, and providing means for adiabatic changes to the fiber core and resultant mode field.

Advantageously, embodiments of optical fiber as claimed herein could find widespread use in high-power laser oscillators and/or amplifiers, from as low as 100 W to as much as 10 kW output power, either with CW beams (single frequency or multi-longitudinal mode) or light pulses (about 100-fs to 1-μs durations, from known chirped pulse amplification and Q-switching techniques). Coherent combining of output beams from multiple amplification channels, each using active LMA optical fibers as disclosed herein, could be performed to scale the power beyond the limit set by state-of-the-art laser amplifiers nowadays. Nonlinear optical crystals could be used with the invention disclosed herein for generating one or more laser frequency harmonics ($2^{nd}$, $3^{rd}$, $4^{th}$ and so on) in the near-infrared, visible and ultraviolet spectral bands. Nonlinear pulse compression could also be performed with the optical fiber disclosed herein to generate high-order harmonics in the extreme UV or soft X-ray using a gas jet in a vacuum chamber inserted downstream the nonlinear pulse compression stage.

Of course, numerous additional modifications could be made to the embodiments described above without departing from the scope of protection as defined in the appended claims.

The invention claimed is:

1. An active Large-Mode-Area (LMA) optical fiber for mitigating Transverse Mode Instability (TMI) effects, the active LMA optical fiber comprising a core and one or more claddings surrounding said core, the core having a refractive index and a temperature coefficient each having a radial profile, the core comprising:
    a center core region having a center core glass composition comprising one or more rare-earth center dopants and one or more center co-dopants, said rare-earth center dopants and center co-dopants having respective concentrations and distributions determining radial profiles of the refractive index and of the temperature coefficient within said center core region; and
    a peripheral core region contiguously surrounding said center core region, the peripheral core region having a peripheral core glass composition which is free of rare-earth dopants and comprises one or more peripheral dopants, said peripheral dopants having respective concentrations and distributions determining radial profiles of the refractive index and of the temperature coefficient within said peripheral core region,
    wherein the radial refractive index-profile of the core is generally continuous across a boundary between the center core region and the peripheral core region; and
    wherein a selection and the concentrations and distributions of the rare-earth center dopants, the center co-dopants and the peripheral dopants are such that the temperature coefficient is lower in the peripheral core region than in the center core region.

2. The active LMA optical fiber according to claim 1, wherein the refractive index of the core has a same uniform value across the center core region and the peripheral core region, and the temperature coefficient has a first uniform value across the center core region and a second uniform value across the peripheral core region.

3. The active LMA optical fiber according to claim 1, wherein the radial temperature-coefficient profile in the core is linearly graded or parabolic.

4. The active LMA optical fiber according to claim 1, wherein the radial temperature-coefficient profile forms a step function at the boundary between the center core region and the peripheral core region.

5. The active LMA optical fiber according to claim 1, wherein the temperature coefficient in the peripheral core region is about 5% to about 35% lower than the temperature coefficient in the center core region.

6. The active LMA optical fiber according to claim 1, wherein the temperature coefficient in the center core region is at least 10% lower than the temperature coefficient in the peripheral core region.

7. The active LMA optical fiber according to claim 1, wherein the temperature coefficient in the center core region is at least 20% lower than the temperature coefficient in the peripheral core region.

8. The active LMA optical fiber according to claim 1, wherein a weighted mean of molar refractivities of the one or more peripheral dopants is about the same as the weighted mean of the molar refractivities of the rare-earth center dopants and center co-dopants and at least one of the peripheral dopants has negative contribution to the temperature coefficient.

9. The active LMA optical fiber according to claim 1, wherein the one or more center co-dopants include at least one of phosphorus, aluminum and fluorine.

10. The active LMA optical fiber according to claim 9, wherein the one or more peripheral dopants include at least one of phosphorus, fluorine and boron.

11. The active LMA optical fiber according to claim 2, wherein:
    the rare-earth center dopant consists of ytterbium;
    the center co-dopants consist of phosphorus, aluminum and fluorine; and
    the peripheral dopants consist of phosphorus and fluorine;
    wherein the peripheral core region has higher concentrations of phosphorus and fluorine than the center core region.

12. The active LMA optical fiber according to claim 2, wherein:
    the rare-earth center dopant consists of ytterbium;
    the center co-dopants consist of phosphorus and aluminum; and
    the peripheral dopant consists of phosphorus;
    wherein the center core region and the peripheral core region have about a same concentration of phosphorus.

13. The active LMA optical fiber according to claim 1, wherein the core has a diameter between about 20 μm and about 60 μm and a core numerical aperture between about 0.06 and 0.10.

14. The active LMA optical fiber according to claim 13, wherein a ratio of a diameter of the center core region to the diameter of the core ranges from about 0.5 to about 0.9.

15. The active LMA optical fiber according to claim 1, wherein the one or more claddings surrounding the core comprise:
    an inner cladding configured to confine a light beam in the core; and
    an outer cladding configured to confine a pump light in the inner cladding.

16. The active LMA optical fiber according to claim 1, wherein an output light beam exiting from an end of the optical fiber has a beam quality factor $M^2$ less than or equal to about 1.3.

17. The active LMA optical fiber according to claim 1, further comprising stress-applying members extending longitudinally within at least one of the one or more claddings.

* * * * *